United States Patent [19]

Chung

[11] Patent Number: 5,734,492
[45] Date of Patent: Mar. 31, 1998

[54] PIEZOELECTRIC ACTUATED MIRROR ARRAY

[76] Inventor: Byung-Hwa Chung, 218-1, Kwangjang-dong, Seongdong-ku, Seoul, Rep. of Korea

[21] Appl. No.: 246,891

[22] Filed: May 20, 1994

[30] Foreign Application Priority Data

May 21, 1993 [KR] Rep. of Korea .................. 93-8859

[51] Int. Cl.$^6$ .................................................. G02B 26/00
[52] U.S. Cl. ........................... 359/291; 359/254; 359/850
[58] Field of Search ................................. 359/254, 263, 359/224, 290, 291, 295, 846, 849, 850

[56] References Cited

U.S. PATENT DOCUMENTS

| | | | |
|---|---|---|---|
| 3,886,310 | 5/1975 | Guldberg et al. | 359/291 |
| 4,615,595 | 10/1986 | Hornbeck | 359/291 |

*Primary Examiner*—David C. Nelms
*Assistant Examiner*—Dawn-Marie Bey
*Attorney, Agent, or Firm*—Anderson, Kill & Olick, P.C.

[57] ABSTRACT

An array of M×N piezoelectric actuated mirrors is prepared by: obtaining a piezoelectric ceramic wafer; forming an array of M×N signal electrodes on the bottom surface of said ceramic wafer and M+1 common reference electrodes on the top surface thereof; mounting said ceramic wafer treated in accordance with above described step on an active substrate matrix; covering said M+1 common reference electrodes with M+1 photoresistive necked segments; providing a set of M trenches, wherein each of the M trenches is located between two common reference electrodes and on the centerline of the signal electrodes, runs parallel to the common reference electrodes, is provided with a set of N−1 identically sized grooves, running perpendicular thereto; placing an array of M×N hinges on said top surface of said ceramic wafer treated in accordance with the above described steps; forming a mirror on the top surface of each of said M×N hinges; removing said M+1 photoresistive necked segments; and connecting electrically each of said M+1 common reference electrodes to a common ground potential.

5 Claims, 4 Drawing Sheets

PIEZOELECTRIC ACTUATED MIRROR ARRAY

FIELD OF THE INVENTION

The present invention relates to an optical projection system; and, more particularly, to an array of piezoelectric actuated mirrors and an improved method for manufacturing same for use in the system.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of a prior art M×N actuated mirror array 100, wherein M and N are integers, comprising an active matrix substrate 1, an array 4 of M×N actuators, e.g., 40, 40', 40", a corresponding array 7 of M×N mirrors, e.g., 70, 70', 70" and a corresponding array 9 of M×N connecting terminals, e.g., 90, 90', 90". Each of the actuators, e.g., 40, in turn, is provided with a top surface 46, a bottom surface 47, and a pair of external sides 48a, 48b; and has a bimorph structure, comprising a pair of electrodisplacive members 42a, 42b, a common signal electrode 43 located between the pair of electrodisplacive members 42a, 42b and a pair of reference electrodes 44a, 44b on the pair of external sides 48a, 48b of the actuator 40, respectively (as all of the actuators, e.g., 40, 40', 40", are essentially identical, the following description will be given with respect to a representative actuator 40).

The electrodisplacive members 42a, 42b are comprised of an electrodisplacive material such as a piezoelectric material, e.g., lead zirconium titanate (PZT), or an electrostrictive material, e.g., lead magnesium niobate-lead titanate (PMN-PT).

The bottom surface 47 of the actuator 40 is mounted on the active substrate matrix 1 and a mirror 70 is mounted on the top surface 46 of the actuator 40. Further, a connecting terminal 90 is used for electrically connecting the common signal electrode 43 in the actuator 40 and the active substrate matrix 1.

When a voltage is applied between the common signal electrode 43 and the reference electrodes 44a, 44b, the electrodisplacive material located therebetween will deform in a direction determined by the polarity of the voltage.

In a copending, commonly owned application, U.S. Ser. No. 08/216,754, entitled "ACTUATOR ARRAY AND METHOD FOR THE MANUFACTURE THEREFOR", there is disclosed a method for manufacturing an array of M×N electrodisplacive actuators for use in the above-described optical projection system, the method comprising the steps of:

(1) forming a multilayered ceramic structure having M layers of a first conductive metallization and M+1 layers of an electrodisplacive material, wherein each layer of the first conductive metallization is placed between two layers of the electrodisplacive material;

(2) obtaining a composite ceramic wafer by slicing the multilayered ceramic structure in a direction normal to the layers of the first conductive metallization;

(3) providing a plurality of regularly spaced horizontally directional trenches running parallel to each other using mechanical means, e.g., sawing, wherein each of the trenches is located at an equidistance from two adjacent layers of the first conductive metallization;

(4) depositing a second conductive metallization; and (5) preparing N−1 regularly spaced vertically directional cuts on the composite ceramic wafer prepared using steps (3) and (4) to thereby obtain the array of M×N electrodisplacive actuators.

The first and the second conductive metallizations serve as the common signal electrode, e.g., 43, and the reference electrodes, e.g., 44a, 44b, in the completed actuated mirror array, respectively.

There is also disclosed, in another copending, commonly assigned application, U.S. Ser. No. 08/216,755, entitled "MIRROR ARRAY AND METHOD FOR THE MANUFACTURE THEREOF", a method for attaching an array of M×N mirrors to an array of M×N electrodisplacive actuators, the method comprising the steps of:

(1) forming a separation layer on a substrate;

(2) depositing a mirror layer on the separation layer;

(3) defining the mirror layer into an array of M×N mirrors;

(4) providing a supporting layer on the substrate treated in accordance with said steps (a) to (c) above;

(5) bonding the actuator array onto the supporting layer such that each of the M×N electrodisplacive actuators is aligned with each of the M×N mirrors defined in step (3);

(6) removing the separation layer, thereby to disengage the substrate from the supporting layer and the mirrors; and (7) patterning the supporting layer into an array of M×N disjointed supporting members, each of the members being commensurate with each of the M×N mirrors, thereby providing an array of M×N actuated mirrors.

There is a number of problems associated with the above-described prior art method for manufacturing an array of M×N electrodisplacive actuators and for attaching an array of M×N mirrors thereto, however. First of all, the first conductive metallization, which will serve as the common signal electrode 43 in the completed actuated mirror array, may be deformed or bend during the sintering process involved in the preparation of the multilayered ceramic structure, which may, in turn, make it difficult to form dimensionally correct trenches and, hence, the actuators. Further, in the case of manufacturing an M×N piezoelectric actuated mirror array, the multilayered ceramic structure must be poled prior to undergoing the steps described above by holding it under a high DC voltage, which will often lead either to an electrical breakdown or an electrical degradation thereof. In addition, since the array of M×N electrodisplacive actuators is manufactured using mechanical means, e.g., sawing, it may be difficult to obtain the desired reproducibility, reliability and yield in the manufacturing of the M×N electrodisplacive actuated mirror array; and, furthermore, there may be a limit to the down sizing thereof.

Moreover, in practicing the prior art method of attaching an array of M×N mirrors to an array of M×N electrodisplacive actuators, it may be difficult not only to align each of the M×N piezoelectric actuators with each of the M×N mirrors, but to remove the separation layer or disengage the substrate from the supporting layer and the mirrors.

SUMMARY OF THE INVENTION

It is, therefore, a primary object of the present invention to provide a method for manufacturing an M×N piezoelectric actuated mirror array, wherein M and N are integers, without using a multilayered piezoelectric ceramic structure.

It is another object of the present invention to provide an improved method for manufacturing an M×N piezoelectric actuated mirror array which will give a higher reproducibility, reliability and yield by utilizing the manufacturing technologies commonly employed in the manufacture of semiconductors.

It is a further object of the present invention to provide a method for manufacturing an M×N piezoelectric actuated mirror array which does not require an extremely high DC voltage during poling.

It is still another object of the present invention to provide a method for manufacturing an M×N piezoelectric actuated mirror array, wherein each of the M×N mirrors and each of the M×N piezoelectric actuators can be easily aligned.

In accordance with one aspect of the present invention, there is provided an improved method for manufacturing an M×N piezoelectric actuated mirror array, wherein M and N are integers, comprising the steps of:

(a) preparing a ceramic wafer, made of a piezoelectric material, having a top and a bottom surfaces;

(b) forming an array of M×N signal electrodes on the bottom surface of said ceramic wafer and M+1 common reference electrodes on the top surface thereof, wherein each of said M+1 common reference electrodes extends across the top surface thereof and each of said M×N signal electrodes overlaps portions of two adjacent common reference electrodes and the centerline between two adjacent common reference electrodes coincides with the centerline thereof;

(c) mounting said ceramic wafer treated in accordance with said step (b) on an active substrate matrix, including a substrate, an array of M×N transistors thereon and an array of M×N connecting terminals thereon, thereby electrically connecting each of the M×N signal electrodes with each of the M×N connecting terminals;

(d) covering said M+1 common reference electrodes with M+1 photoresistive necked segments, wherein each of said M+1 photoresistive necked segments is provided with a top and a bottom surfaces;

(e) providing a set of M trenches, wherein each of said M trenches is located between two common reference electrodes and on the centerline of the signal electrodes, runs parallel to the common reference electrodes, is provided with a set of N−1 grooves, running perpendicular thereto;

(f) placing an array of M×N hinges on the top surface of said ceramic wafer treated in accordance with said steps (b), (c), (d) and (e) wherein each of said M×N hinges is provided with a top surface and a bottom surface provided with a protrusion fitted to each of the trenches;

(g) forming a mirror on the top surface of each of said M×N hinges;

(h) removing said M+1 photoresistive necked segments; and (i) connecting electrically each of said M+1 common reference electrodes to a common ground.

In accordance with another aspect of the present invention, there is provided an M×N piezoelectric actuated mirror array for use in an optical projection system, comprising:

an active substrate matrix including a substrate and an array of M×N transistors thereon;

an array of M×N piezoelectric actuators, wherein each of the M×N piezoelectric actuators includes a piezoelectric member having a top and a bottom surfaces, the top surface being evenly separated by a trench of a fixed depth formed on the piezoelectric member, a signal electrode located on the bottom surface whose centerline is aligned with the centerline of the trench, and a pair of common reference electrodes, located on the separated top surface;

an array of M×N hinges provided with a top surface and a bottom surface having a protrusion fitted to the trench in each of said M×N piezoelectric actuators;

an array of M×N connecting terminals for electrically connecting the signal electrodes with the active substrate matrix; and an array of M×N mirrors wherein each of said M×N mirrors is mounted on the top surface of each of said M×N hinges.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1:
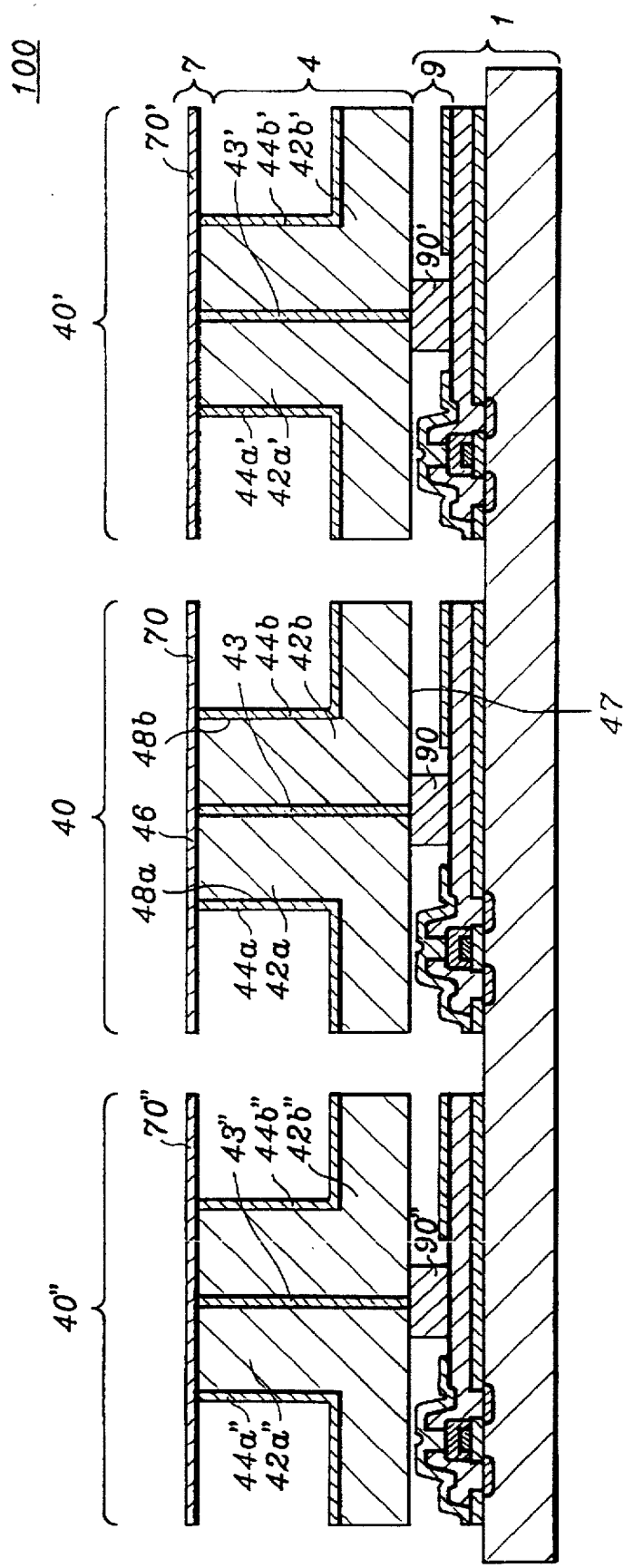
FIG. 1 shows a cross sectional view of a prior art M×N piezoelectric actuated mirror array.
Figure 2A:
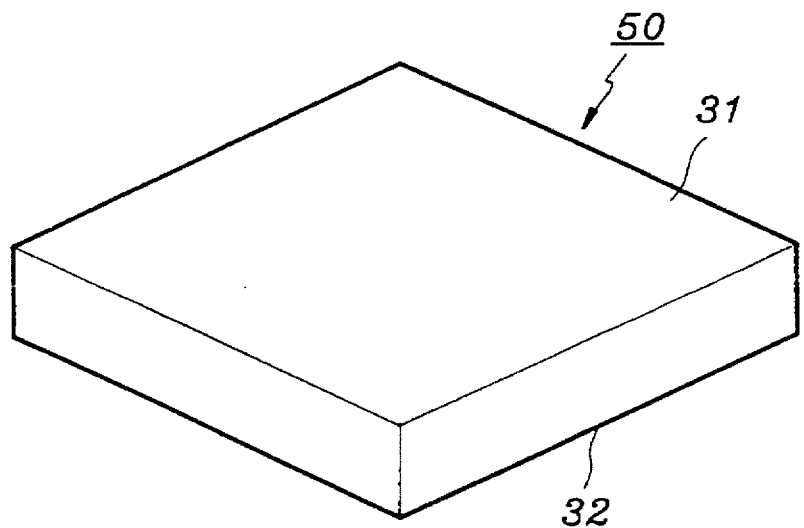
FIGS. 2A to 2E illustrate the steps used in constructing an M×N piezoelectric actuated mirror array in accordance with the present invention.

In accordance with the present invention, the process for manufacturing the inventive M×N piezoelectric actuated mirror array begins with the preparation of a ceramic wafer 50, as shown in FIG. 2A, made of a piezoelectric material, e.g., lead zirconium titanate(PZT), and having a top and a bottom surfaces, 31, 32, wherein the top and the bottom surfaces, 31, 32, are flat and parallel to each other.

Figure 2B:
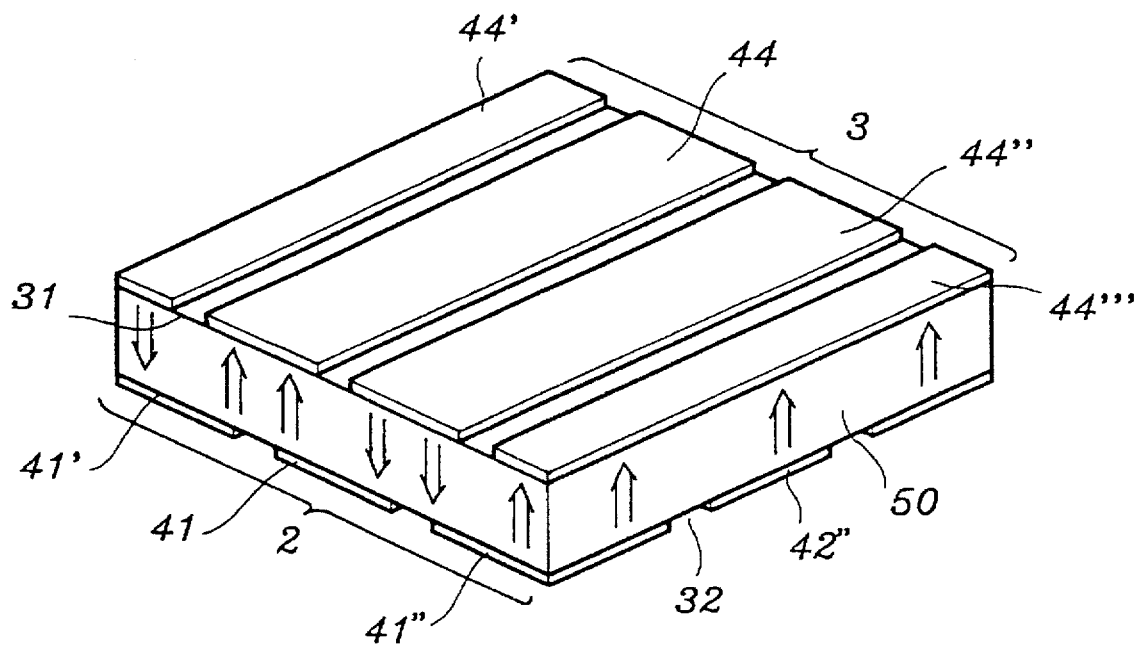

As shown in FIG. 2B, on the bottom surface 32 of the ceramic wafer 50, there is formed an array 2 of M×N regularly spaced, identically sized signal electrodes, e.g., 41, 41', 41", and on the top surface 31 thereof, an array 3 of M+1 regularly spaced, identically sized common reference electrodes, e.g., 44, 44', 44", wherein each of the M+1 common reference electrodes, e.g., 44, extends across the top surface 31 of the ceramic wafer 50, runs parallel to each other, and each of the M×N signal electrodes, e.g., 41, is placed in such a way that it overlaps portions of two adjacent common reference electrodes, e.g., 44, 44" and the centerline between two adjacent common reference electrodes, e.g., 44, 44", coincides with the centerline thereof.

The array 2 of M×N signal electrodes, e.g., 41, 41', 41" and the array 1 of M+1 common reference electrodes, e.g., 44, 44', 44", are obtained by covering the entire top and bottom surfaces 31, 32 with a conductive metallization, e.g., Al, Cu or Ni, using a sputtering method, and then obtaining the required electrode pattern using a photolithography method.

Figure 2C:
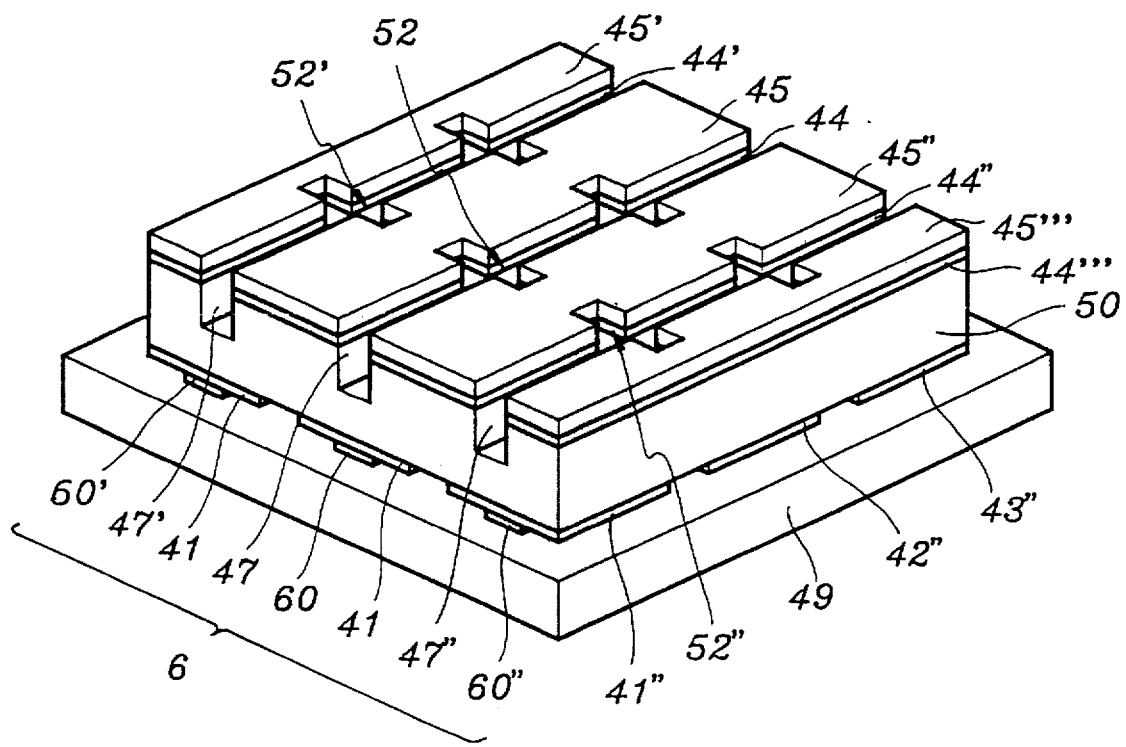

Since the ceramic wafer 50 is made of a piezoelectric material, e.g., PZT, it must be polarized, which is carried out in two stages: a first stage involving the application of a D.C. voltage between every other common reference electrodes, e.g., 44', 44", and the signal electrodes, e.g., 41, 41', 44", wherein the signal electrodes are connected to ground (not shown); and a second stage involving the application of the same D.C. voltage between the remaining common reference electrodes, e.g., 44, 44''', and the signal electrodes, e.g., 41, 41', 41", wherein, in contrast with first stage, the common reference electrodes are connected to ground (not shown), thereby polarizing the piezoelectric material located therebetween in an opposite direction to the polarization direction of the first stage, as shown in FIG. 2C.

Thereafter, the ceramic wafer 50 treated in accordance with the above-described steps is mounted, as shown in FIG. 2C, on an active substrate matrix 49, including a substrate, made of an insulating material, e.g., $Al_2O_3$, or glass, or a semiconductor, e.g., Si, an array of M×N transistors (not shown) and an array 6 of M×N connecting terminals, e.g., 60, 60', 60", thereon. Each of the M×N connecting terminals, e.g., 60, is electrically connected with each of the M×N signal electrodes, e.g., 41, using a conductive adhesive.

In the subsequent step, the M+1 common reference electrodes are covered with M+1 photoresistive segments, e.g., 45, 45', 45", to be used as an etching mask as shown in FIG. 2C.

Thereafter, the areas not covered by the M+1 photoresistive segments are removed using a dry or wet etching method, thereby forming a set of M regularly spaced, identically sized trenches as shown in FIG. 2C, e.g., 47, 47', 47", running parallel to the M+1 common reference electrodes, wherein each of the M trenches, e.g., 47, is aligned with the centerline of each of the signal electrodes, e.g., 41, and is provided with a set of N−1 equally spaced, identically sized grooves, e.g., 52, 52', 52", of a fixed length, running perpendicular thereto.

The N−1 grooves are identically placed in all of the M trenches and none of the N−1 grooves in each of the M trenches comes into contact with the grooves in the adjacent trenches. The width and the depth of the M trenches and the M×(N−1) grooves formed are within a range from 3 to 5 μm and from 10 to 20 μm, respectively.

Figure 2D:
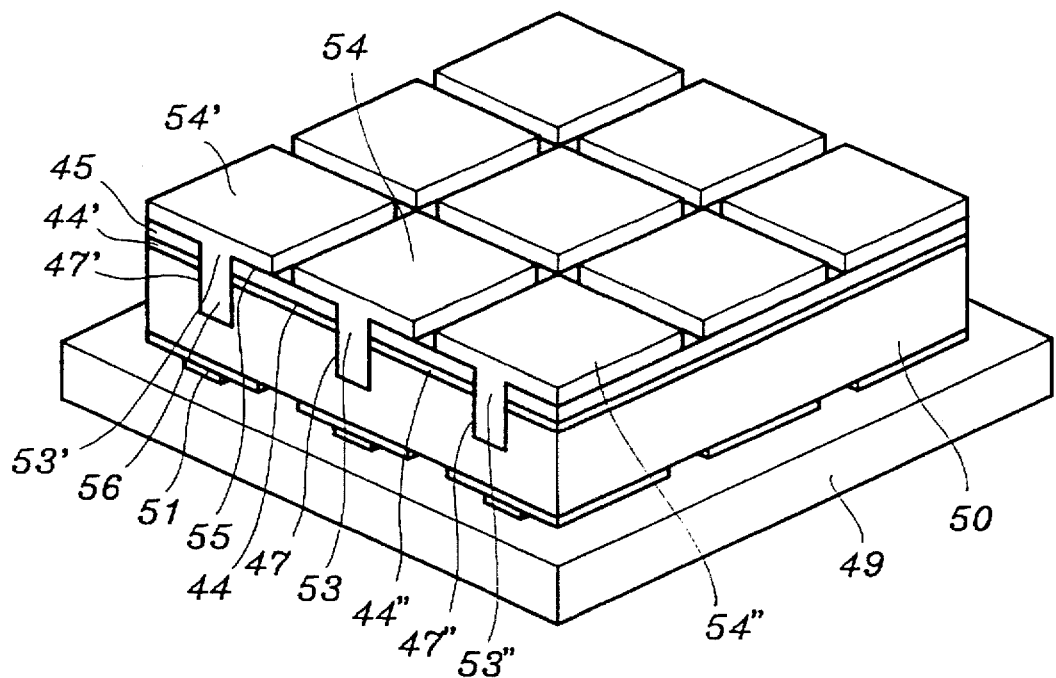

In FIG. 2D, there is shown an array 8 of M×N hinges, e.g., 53, 53', 53", placed on top of the ceramic wafer treated in accordance with the above-described steps wherein each of the M×N hinges, e.g., 53, is provided with a flat top surface 54 and a bottom surface 55 with a protrusion 56 such that the protrusion can be fitted to the trenches, e.g., 47. The hinges are made of a resin which solidifies when exposed to an UV light.

Figure 2E:
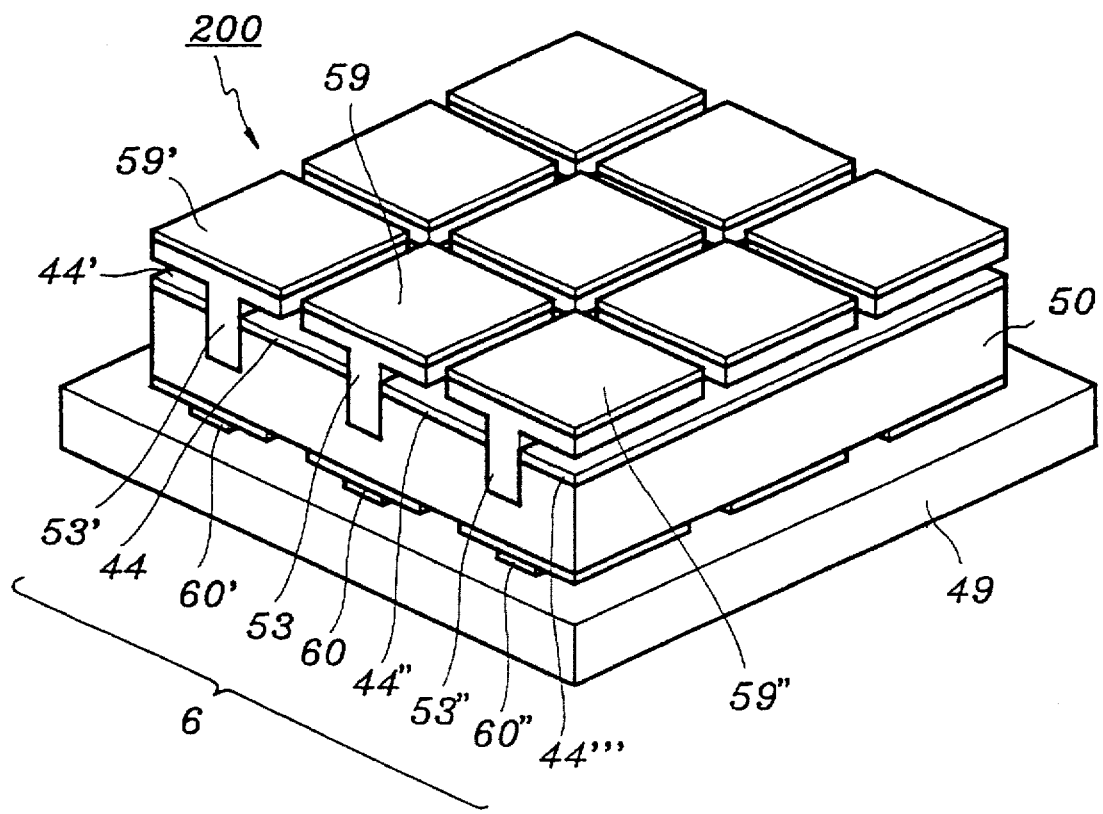
Figure 3:
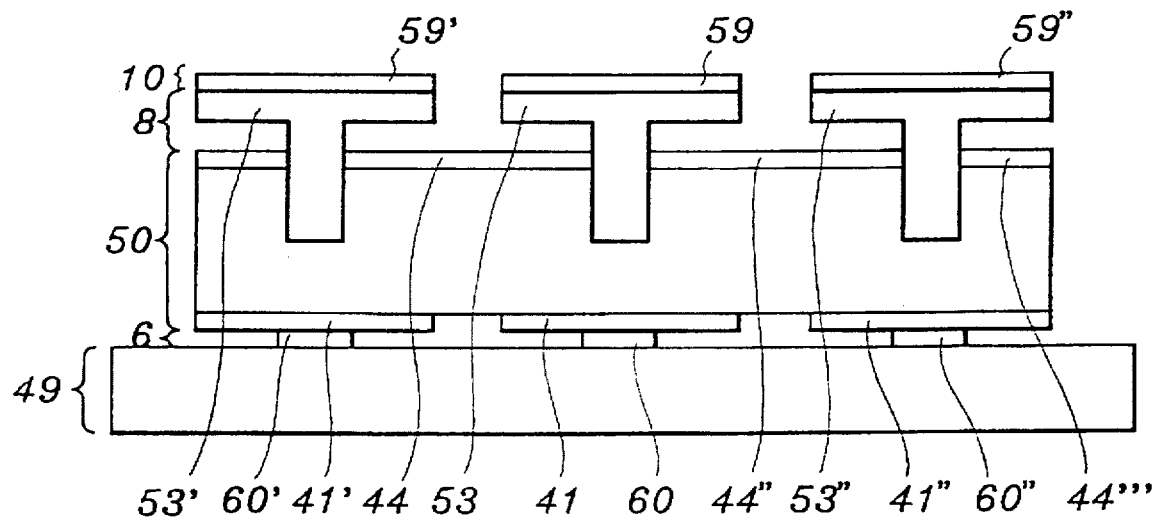
FIG. 3 depicts a cross sectional view of a completed M×N piezoelectric actuated mirror array prepared in accordance with the present invention.

Thereafter, an array 10 of M×N mirrors, e.g., 59, 59', 59", made of a light reflecting material, e.g., Al, are formed on the top surface of the M×N hinges using such a conventional technique as sputtering method. Once the M×N mirrors are formed, the photoresistive segments, e.g., 45, 45', 45", are removed. Furthermore, in order to prevent irregular reflections of the light from the light reflecting surface that might be formed during the sputtering on the areas of the hinges other than the top surface 54, a water soluble separator (not shown) is provided on the exposed region of the photoresistive necked segments, i.e., the region not covered by the M×N hinges, prior to the sputtering. The separator will be removed afterward. In the subsequent step, the common reference electrodes, e.g., 44, 44', 44", are interconnected to a common ground potential (not shown), thereby forming an M×N piezoelectric actuated mirror array 200 as shown in FIGS. 2E and 3.

In this embodiment, an addressable driver (not shown) mounted on the bottom surface of the substrate 49 may be employed to apply a voltage to the signal electrode in each of the M×N actuators for a desired tilting of the mirror. The voltage may be developed in accordance with the corresponding pixel intensity in an optical projection system.

While the present invention has been described with respect to certain preferred embodiments only, other modifications and variations may be made without departing from the scope of the present invention as set forth in the following claims.

What is claimed is:

1. An array of M×N piezoelectric actuated mirrors for use in an optical projection system, comprising:

an active substrate matrix comprising a substrate;

an array of M×N piezoelectric actuators wherein each of said M×N piezoelectric actuators includes a piezoelectric member having a top and a bottom surface, said top surface being evenly separated by a trench of a fixed depth formed on the piezoelectric member, a signal electrode located on the bottom surface whose centerline is aligned with the centerline of the trench, and a pair of common reference electrodes located on the separated top surface;

an array of M×N hinges provided with a top surface and a bottom surface provided with a protrusion fitted to the trench in each of said M×N piezoelectric actuators;

an array of M×N connecting terminals for electrically connecting the signal electrodes with the active substrate matrix; and an array of M×N mirrors wherein each of said M×N mirrors is mounted on the top surface of each of said M×N hinges.

2. The array of M×N piezoelectric actuated mirrors of claim 1, wherein the piezoelectric member is polarized.

3. The array of M×N piezoelectric actuated mirrors of claim 1, wherein said M×N hinges are made up of a resin which solidifies when exposed to an UV light.

4. The array of M×N piezoelectric actuated mirrors of claim 1, wherein the pair of common reference electrodes and the signal electrode are formed of a conductive metallization.

5. The array of M×N piezoelectric actuated mirrors of claim 1, wherein the pair of common reference electrodes are shared by two adjacent actuators.

* * * * *

UNITED STATES PATENT AND TRADEMARK OFFICE
CERTIFICATE OF CORRECTION

PATENT NO. : 5,734,492
DATED : March 31, 1998
INVENTOR(S) : Byung-Hwa Chung

It is certified that error appears in the above-indentified patent and that said Letters Patent is hereby corrected as shown below:

ON THE TITLE PAGE:

Item [73]  Assignee: Daewoo Electronics Co., Ltd,
                     Seoul Rep. of Korea Signed and Sealed this Fourth Day of August, 1998

Attest:

BRUCE LEHMAN

Attesting Officer          Commissioner of Patents and Trademarks